United States Patent
Xu et al.

(10) Patent No.: US 12,060,297 B2
(45) Date of Patent: *Aug. 13, 2024

(54) METHODS AND APPARATUS OF PROCESSING TRANSPARENT SUBSTRATES

(71) Applicant: Applied Materials, Inc., Santa Clara, CA (US)

(72) Inventors: Yongan Xu, Santa Clara, CA (US); Chien-An Chen, San Jose, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,803

(22) Filed: Sep. 3, 2021

(65) Prior Publication Data

US 2021/0395139 A1    Dec. 23, 2021

Related U.S. Application Data

(63) Continuation of application No. 16/803,956, filed on Feb. 27, 2020, now Pat. No. 11,111,176.

(51) Int. Cl.
   *B32B 15/04* (2006.01)
   *B32B 17/06* (2006.01)
   (Continued)

(52) U.S. Cl.
   CPC ...... *C03C 17/3639* (2013.01); *C03C 17/3626* (2013.01); *C03C 17/3636* (2013.01);
   (Continued)

(58) Field of Classification Search
   CPC .................... C03C 2218/365; C03C 2217/213
   (Continued)

(56) References Cited

U.S. PATENT DOCUMENTS 6,285,424 B1 * 9/2001 Yoshida ............ G02F 1/133512
                                                    430/7
6,475,682 B2 * 11/2002 Priestley .................. G03F 1/60
                                                    430/5
(Continued)

FOREIGN PATENT DOCUMENTS

JP       2006-220793 A      8/2006
JP       2019219651 A      12/2019
(Continued)

OTHER PUBLICATIONS

JP2019219654 English machine translation.*
(Continued)

*Primary Examiner* — Lauren R Colgan
(74) *Attorney, Agent, or Firm* — Patterson + Sheridan, LLP (57) ABSTRACT

Aspects of the present disclosure relate generally to methods and apparatus of processing transparent substrates, such as glass substrates. In one implementation, a film stack for optical devices includes a glass substrate including a first surface and a second surface. The film stack includes a device function layer formed on the first surface, a hard mask layer formed on the device function layer, and a substrate recognition layer formed on the hard mask layer. The hard mask layer includes one or more of chromium, ruthenium, or titanium nitride. The film stack includes a backside layer formed on the second surface. The backside layer formed on the second surface includes one or more of a conductive layer or an oxide layer.

19 Claims, 6 Drawing Sheets

(51) Int. Cl.
  *C03C 17/36* (2006.01)
  *C03C 17/38* (2006.01)
(52) U.S. Cl.
  CPC .......... *C03C 17/3655* (2013.01); *C03C 17/38* (2013.01); *C03C 2217/213* (2013.01); *C03C 2218/365* (2013.01)
(58) Field of Classification Search
  USPC ........................................ 428/426, 428, 432
  See application file for complete search history.

(56) References Cited

U.S. PATENT DOCUMENTS

| | | | |
|---|---|---|---|
| 7,807,248 | B2 | 10/2010 | German et al. |
| 10,921,705 | B2* | 2/2021 | Ikebe .................... G03F 1/24 |
| 10,928,721 | B2* | 2/2021 | Ikuta .................... G03F 1/24 |
| 11,111,176 | B1* | 9/2021 | Xu .................... C03C 17/3417 |
| 2004/0124174 | A1* | 7/2004 | Yan .................... C03C 17/36 |
| | | | 430/5 |
| 2004/0209173 | A1* | 10/2004 | Chan .................... G03F 1/76 |
| | | | 430/323 |
| 2005/0042526 | A1* | 2/2005 | Lee .................... G03F 1/54 |
| | | | 428/428 |
| 2005/0221199 | A1* | 10/2005 | Sandstrom ............ G03F 7/091 |
| | | | 428/428 |
| 2005/0238922 | A1* | 10/2005 | Kinoshita ........... C03C 17/3626 |
| | | | 204/192.27 |
| 2014/0033974 | A1* | 2/2014 | Hong .................... B05C 21/005 |
| | | | 118/500 |
| 2015/0017574 | A1* | 1/2015 | Orihara .................... C03C 3/06 |
| | | | 430/311 |
| 2017/0023856 | A1* | 1/2017 | Okubo .................... G03F 1/26 |
| 2018/0149962 | A1* | 5/2018 | Kobayashi ................ G03F 1/40 |
| 2018/0329285 | A1* | 11/2018 | Hamamoto ............. C03C 15/00 |
| 2020/0058901 | A1* | 2/2020 | Choi .................... B32B 27/36 |

FOREIGN PATENT DOCUMENTS

| | | |
|---|---|---|
| KR | 20120101258 A | 9/2012 |
| KR | 20190044246 A | 4/2019 |
| WO | 2017090485 A1 | 6/2017 |
| WO | 2018159785 A1 | 9/2018 |

OTHER PUBLICATIONS

International Search Report and Written Opinion dated May 12, 2021 for Application No. PCT/US2021/014589.
Restriction Requirement dated May 14, 2021 for U.S. Appl. No. 16/803,956.
TW Office Action for Taiwan Patent Application No. 10839496 dated Apr. 7, 2022.
JP Office Action for Japanese Application No. 2022-550134 dated Nov. 14, 2023.
Korean Office Action dated Mar. 18, 2024 for Korean Patent Application No. 10-2022-7032852.
European Search Report in related application 21759756.6 dated Jun. 5, 2024.

* cited by examiner

METHODS AND APPARATUS OF PROCESSING TRANSPARENT SUBSTRATES

CROSS-REFERENCE TO RELATED APPLICATION

This application is a continuation of U.S. patent application Ser. No. 16/803,956, filed Feb. 27, 2020, which is herein incorporated by reference in its entirety.

BACKGROUND

Field

Aspects of the present disclosure relate generally to methods and apparatus of processing transparent substrates, such as glass substrates. In one example, the glass substrates are processed prior to undergoing lithography processing.

Description of the Related Art

Operational issues can arise when attempts are made to process transparent substrates using lithography methods. For example, the transparency of the substrates can make it difficult for lithography machines to recognize that a substrate is in position for processing. As another example, the transparency of the substrates can make it difficult to align the substrate under a lithography machine. Difficulty in recognizing the substrates and difficulty in aligning the substrates results in inefficiencies, lower die-per-substrate due to dies being out of alignment during patterning, increased substrate defects, lower throughput for the machine, increased machine downtime, and increased operational costs.

Therefore, there is a need for apparatus and methods that facilitate use of transparent substrates in lithography processes to facilitate increased efficiency, increased die-per-substrate, reduced substrate defects, increased machine throughput, reduced machine downtime, and reduced operational costs.

SUMMARY

Aspects of the present disclosure relate generally to methods and apparatus of processing transparent substrates, such as glass substrates. In one example, the glass substrates are processed prior to undergoing lithography processing.

In one implementation, a film stack for optical devices includes a glass substrate including a first surface and a second surface. The second surface opposes the first surface and the first surface is disposed above the second surface. The film stack includes a device function layer formed on the first surface, a hard mask layer formed on the device function layer, and a substrate recognition layer formed on the hard mask layer. The hard mask layer includes one or more of chromium, ruthenium, or titanium nitride. The film stack includes a backside layer formed on the second surface. The backside layer formed on the second surface includes one or more of a conductive layer or an oxide layer.

In one implementation, a method of processing a film stack for optical devices includes providing the film stack. The film stack includes a glass substrate including a first surface and a second surface opposing the first surface, and a plurality of layers formed on the first surface of the glass substrate. A hard mask layer of the plurality of layers includes one or more of chromium, ruthenium, or titanium nitride. The method includes recognizing a substrate recognition layer of the plurality of layers. The method includes patterning the film stack to form a tri-layer lithography structure on the plurality of layers. The method includes etching the tri-layer lithography structure and the plurality of layers to form a first plurality structures on the first surface of the glass substrate and a second plurality of structures stacked on the first plurality of structures.

In one implementation, a film stack for optical devices includes a glass substrate including a first surface and a second surface. The second surface opposes the first surface and the first surface is disposed above the second surface. The film stack includes a plurality of stacks formed on the first surface. Each stack of the plurality of stacks includes a first plurality of formed on the first surface of the glass substrate, and a second plurality of structures stacked on the first plurality of structures. One or more of the first plurality of structures or the second plurality of structures includes one or more of chromium, ruthenium, or titanium nitride. The film stack includes a backside layer formed on the second surface of the glass substrate.

BRIEF DESCRIPTION OF THE DRAWINGS

So that the manner in which the above-recited features of the disclosure can be understood in detail, a more particular description of the disclosure, briefly summarized above, may be had by reference to implementations, some of which are illustrated in the appended drawings. It is to be noted, however, that the appended drawings illustrate only common implementations of this disclosure and are therefore not to be considered limiting of its scope, for the disclosure may admit to other equally effective implementations.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate generally to methods and apparatus of processing transparent substrates, such as glass substrates. In one example, the glass substrates are processed prior to undergoing lithography processing.

Figure 1A:
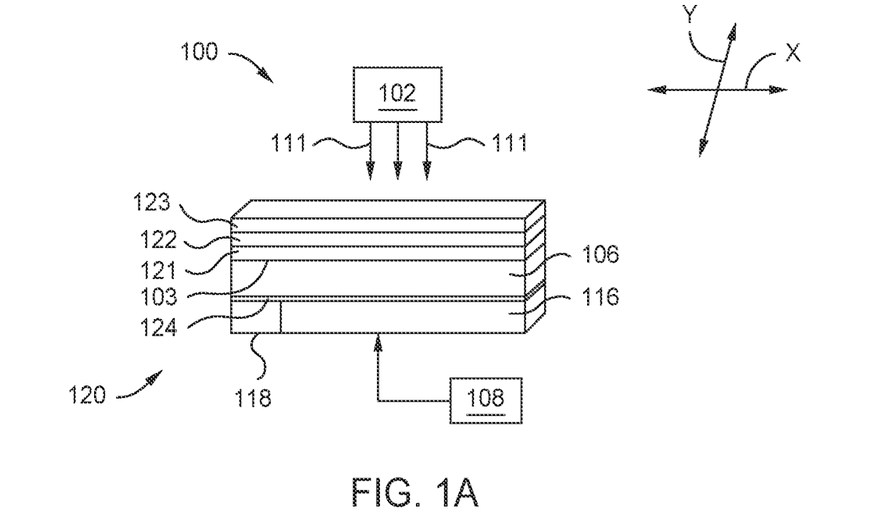
FIG. 1A is a partial schematic view of a lithography system, according to one implementation.
Figure 1B:
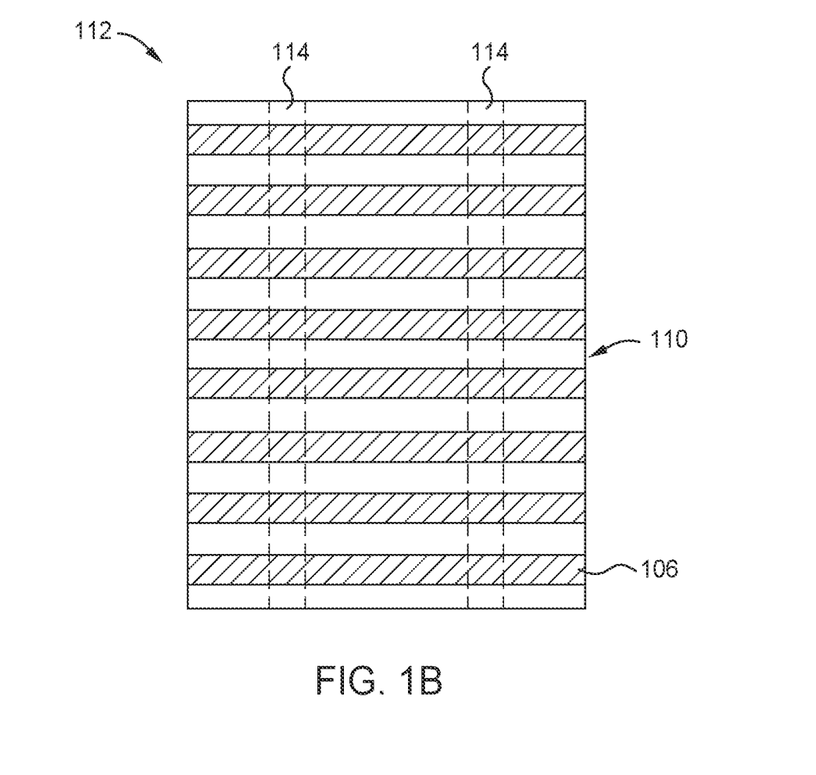
FIG. 1B is a partial schematic plan view of a substrate exposed to a lithography process, according to one implementation.

FIG. 1A is a partial schematic view of a lithography system 100, according to one implementation. FIG. 1B is a partial schematic plan view of a substrate 106 exposed to a lithography process, according to one implementation. It is to be understood that the lithography system 100 is an exemplary system and other systems may be used with or modified to accomplish aspects of the present disclosure. The lithography system 100 includes a projection unit 102 that includes one or more light sources, such as a light emitting diodes (LEDs) or lasers, capable of projecting write beams 111 to pattern the substrate 106 having one or more layers 121-123 (three are shown) formed on a first surface 103 of the substrate 106. The write beams 111 are projected in the direction of the one or more layers 121-123 formed on the substrate 106. The one or more layers 121-123 may include a mask pattern. The substrate 106 and the layers 121-123 are at least part of a film stack 120. The one or more layers 121-123 may be deposited on the first surface 103 of the substrate 106, such as by using physical vapor deposition, chemical vapor deposition, atomic layer deposition, a spin-on nanoparticle process, an electroplating process, and/or an evaporation process. In one example, the hard mask layer 122 is formed using physical vapor deposition, an electroplating process, or an evaporation process. In one example, the substrate recognition layer 123 is formed using physical vapor deposition, chemical vapor deposition, or a spin-on nanoparticle process. In one example, the device function layer 121 is formed using physical vapor deposition, chemical vapor deposition, or a spin-on nanoparticle process.

The substrate 106 is a transparent substrate. In one embodiment, which can be combined with other embodiments, the substrate 106 is a glass substrate. The substrate may include any suitable material which is used as part of a flat panel display. In one embodiment, which can be combined with other embodiments, the substrate 106 has a size, such as a diameter, within a range of 100 mm to 450 mm. In one example, the size of the substrate 106 is 100 mm. In one example, the size of the substrate 106 is 150 mm. In one example, the size of the substrate is 200 mm. In one example, the size of the substrate is 300 mm. In one embodiment, which can be combined with other embodiments, the substrate 106 has a size, such as a diameter, within a range of 4 inches to 18 inches. In one example, the size of the substrate 106 is about 4 inches. In one example, the size of the substrate 106 is about 6 inches. In one example, the size of the substrate 106 is about 8 inches. In one example, the size of the substrate 106 is about 12 inches.

In one embodiment, which can be combined with other embodiments, the substrate 106 has a thickness within a range of 150 microns (μm) to 850 microns (μm). In one example, the substrate 106 has a thickness of 200±50 microns (μm). In one example, the substrate 106 has a thickness of 300±50 microns (μm). In one example, the substrate 106 has a thickness of 400±50 microns (μm). In one example, the substrate 106 has a thickness of 500±50 microns (μm). In one example, the substrate 106 has a thickness of 600±50 microns (μm). In one example, the substrate 106 has a thickness of 750±50 microns (μm). In one example, the substrate 106 has a thickness of 800±50 microns (μm).

In one embodiment, which can be combined with other embodiments, the substrate 106 has a surface width of 5 mm to 70 mm, such as from 5 mm to 100 mm, such as from 5 mm to 20 mm, or from 50 mm to 60 mm. In one embodiment, which can be combined with other embodiments, the substrate 106 has a surface length of from 5 mm to 100 mm, such as from 5 mm to 60 mm, such as from 5 mm to 20 mm, or from 50 mm to 60 mm. In one example, the substrate 106 has dimensions of from 30 mm to 60 mm by from 25 mm to 60 mm. One or more of the layers 121-123 is a film layer to be patterned formed, such as by pattern etching thereof.

The film stack 120 includes a photoresist layer 110 formed on the layers 121-123. The photoresist layer 110 is sensitive to electromagnetic radiation, for example, UV, EUV or deep UV "light". A positive tone photoresist includes portions of the photoresist layer 110, when exposed to radiation, are respectively soluble to a photoresist developer applied to the photoresist layer 110 after the pattern is written into the photoresist layer 110 using the electromagnetic radiation. A negative tone photoresist includes portions of the photoresist layer 110 that, when exposed to radiation, will be respectively insoluble to photoresist developer applied to the photoresist layer 110 after the pattern is written into the photoresist layer 110 using the electromagnetic radiation. A negative tone development includes the photoresist layer 110 that is positive tone and exposed by bright field mask, where the exposed region will be respectively insoluble in organic solvent (e.g. n-butanol) and remain on the substrate 106 post development. The chemical composition of the photoresist layer 110 determines whether the photoresist layer 110 is a positive photoresist or negative photoresist.

During lithography operations, the projection unit 102 projects the write beams 111 in the direction of the one or more of the one or more layers 121-123. The mask patterned layers 121-123 may correspond to a device pattern 112 to be written into a photoresist layer 110, when the write beams 111 are projected in the direction of one or more of the layers 121-123. The device pattern 112 can include device portions 114 of the device pattern 112 written into the photoresist layer 110. The device pattern 112 may correspond to a device to be patterned into the substrate 106 or a film layer disposed on the substrate 106. In other embodiments, which can be combined with other embodiments described herein, the device pattern 112 may correspond to one or more devices to be patterned into the substrate 106 or a film layer disposed on the substrate 106.

In one embodiment, which can be combined with other embodiments, the lithography system 100 is sized to be capable of exposing the entire photoresist layer 110 on the substrate 106 to the write beams 111. In other embodiments, which can be combined with other embodiments described herein, the substrate 106 is supported by a stage 116 operable to positon the substrate 106 in a predetermined path beneath the projection unit 102. The movement of the substrate 106 on the stage 116 may be controlled by a controller 108. The controller 108 is generally designed to facilitate the control and automation of a lithography process based on a mask pattern file. The controller 108 may be coupled to or in communication with at least the projection unit 102, the stage 116, and/or an encoder 118. The projection unit 102 and the encoder 118 may provide information to the controller 108 regarding the substrate processing and the substrate aligning. For example, the projection unit 102 may provide information to the controller 108 to alert the controller 108 that substrate processing has been completed.

The stage 116 is configured to move and position the substrate 106 along an X-axis and a Y-axis. As discussed above, the substrate 106 is a glass substrate. Aspects of the present disclosure, described above and below, facilitate the lithography system 100 including the projection unit 102 being able to recognize that the transparent glass substrate 106 is in position to be scanned and patterned. If the lithography system 100 would not recognize the substrate 106 being in position, then it may not begin to pattern the substrate 106 and may display an error message to operators. Aspects of the present disclosure, described above and below, also facilitate proper alignment of the substrate 106 under the projection unit 102 of the lithography system 100 along the X-axis and the Y-axis. Facilitating recognition of the substrate 106 by the lithography system 100 and facilitating alignment of the substrate 106 relative to the lithography system 100 facilitates use of transparent substrates in lithography processes, increased efficiency, increased die-per-substrate, reduced substrate defects, increased machine throughput, reduced machine downtime, and reduced operational costs.

Figure 1C:
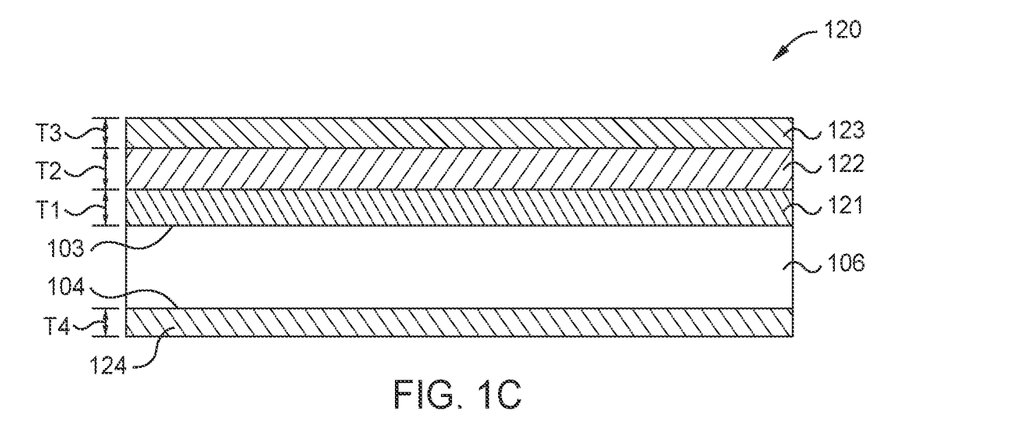
FIG. 1C is a partial schematic view of the film stack illustrated in FIG. 1A, according to one implementation.

FIG. 1C is a partial schematic view of the film stack 120 illustrated in FIG. 1A, according to one implementation. The film stack 120 is an integration film stack. The film stack 120 maybe patterned and etched for use in optical devices, such as lens devices. The film stack 120 may be used in conjunction with a lithography tool of a lithography system for lithography processing of the substrate 106 of the film stack 120. The film stack 120 includes the substrate 106, which is a transparent glass substrate. The substrate 106 includes the first surface 103 and a second surface 104 opposing the first surface 103. The first surface 103 is disposed above the second surface 104. In one example, the first surface 103 is a frontside surface of the substrate 106 and the second surface 104 is a backside surface of the substrate 106.

The one or more layers 121-123 formed on the first surface 103 include a device function layer 121 formed on the first surface 103, a hard mask layer 122 formed on an upper surface of the device function layer 121, and a substrate recognition layer 123 formed on an upper surface of the hard mask layer 122. The film stack 120 also includes one or more backside layers 124 (one is shown) formed on the second surface 104 of the substrate 106. The one or more backside layers 124 formed on the second surface 104 includes a backside layer 124 formed on the second surface 104.

In one embodiment, which can be combined with other embodiments, the backside layer 124 is omitted from the film stack 120.

The device function layer 121 is a film layer. The device function layer 121 includes a thickness T1 within a range of 20 nm to 500 nm. The device function layer 121 includes one or more of titanium dioxide (TiO2), niobium monoxide (NbO), and/or niobium pentoxide $Nb_2O_5$. In one example, the device function layer 121 includes titanium dioxide (TiO2) and niobium monoxide (NbO). A phase of the device function layer 121 is amorphous or crystalline. At least one of the one or more layers 121-123 includes one or more of chromium, ruthenium, and/or titanium nitride.

In one embodiment, which can be combined with other embodiments, the device function layer 121 is omitted from the film stack 120 such that the hard mask layer 122 is formed on the first surface 103 of the substrate 106.

The hard mask layer 122 facilitates at least alignment of the substrate 106 during lithography processing and/or etching of the film stack 120. The hard mask layer 122 is a film layer. The hard mask layer 122 includes one or more of chromium, ruthenium, titanium, and/or nitrogen. In one example, the hard mask layer 122 includes titanium nitride (TiN). The hard mask layer 122 is between the substrate recognition layer 123 and the device function layer 121. In one embodiment, which can be combined with other embodiments, the hard mask layer 122 includes chromium and ruthenium. The hard mask layer 122 includes a thickness T2 within a range of 10 nm to 400 nm. Aspects of the hard mask layer 122, for example the chromium and/or the ruthenium, facilitate providing a contrast of the hard mask layer 122 relative to one or more of the device function layer 121, the glass substrate 106 (which is transparent), and/or the backside layer 124. The contrast of the hard mask layer 122 facilitates aligning the substrate 106 relative to the projection unit 102 of the lithography system 100 along the X-axis and the Y-axis during lithography processing. In one embodiment, which can be combined with other embodiments, the hard mask layer 122 includes one or more alignment marks—such as protrusions, recesses, or contrasted colors—formed thereon. The lithography system 100 may detect the alignment marks when the substrate 106 is in an alignment relative to the lithography system 100 for lithography processing. Aspects of the hard mask layer 122 also facilitates etching of the film stack 120.

The substrate recognition layer 123 facilitates at least patterning of the film stack 120, etching of the film stack 120 and/or recognition of the substrate 106 by the lithography system 100. The substrate recognition layer 123 is a film layer. The substrate recognition layer 123 includes silicon. In one example, the substrate recognition layer 123 includes one or more of silicon dioxide ($SiO_2$), silicon oxynitride (SiON), silicon nitride (SiN), amorphous silicon, poly silicon, and/or silicon doped materials. The substrate recognition layer 123 includes a thickness T3 within a range of 10 nm to 200 nm. In one embodiment, which can be combined with other embodiments, the substrate recognition layer 123 includes one or more recognition marks—such as protrusions, recesses, or contrasted colors—formed thereon. The lithography system 100 may detect the recognition marks when the substrate 106 is in a position relative to the lithography system 100 for lithography processing.

The backside layer 124 is a film layer. The backside layer 124 may include one or more of a backside protection layer, a second device function layer, and/or a substrate recognition layer. The backside layer 124 may protect the second surface 104 and/or facilitates recognition of the substrate 106 by the lithography system 100. The backside layer 124 may be a device function layer. In one embodiment, which can be combined with other embodiments, the backside layer 124 includes one or more recognition marks—such as protrusions, recesses, or contrasted colors—formed thereon. The lithography system 100 may detect the recognition marks when the substrate 106 is in a position relative to the lithography system 100 for lithography processing. The backside layer 124 is an oxide layer or a conductive layer. The backside layer 124 includes one or more of silicon or silicon oxide. The backside layer 124 includes a thickness T4 within a range of 10 nm to 600 nm.

FIGS. 2A-2F illustrate partial schematic views of operations flow of a method 200 of processing the film stack 120 illustrated in FIG. 1C, according to various implementations.

Figure 2A:
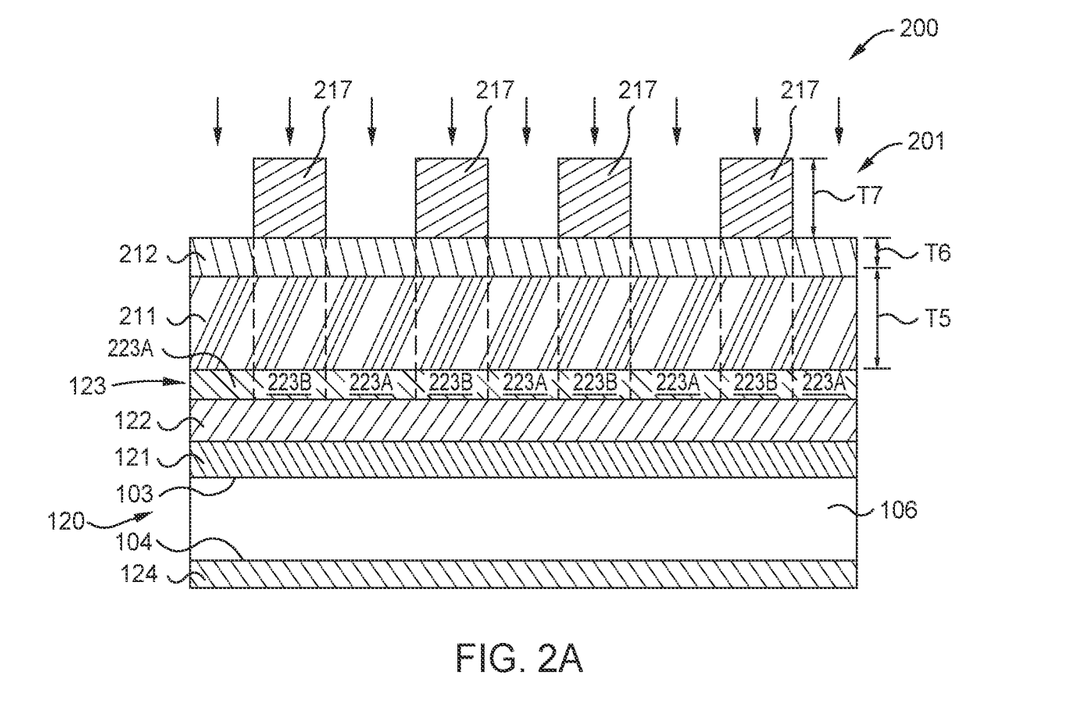
FIG. 2A illustrates a partial schematic view of the film stack illustrated in FIG. 1C after the film stack is patterned using a lithography process, according to one implementation.

FIG. 2A illustrates a partial schematic view of the film stack 120 illustrated in FIG. 1C after the film stack 120 is patterned using a lithography process, according to one implementation. The film stack 120 is provided, and a tri-layer lithography structure 201 is patterned and formed on the film stack 120 using tri-layer patterning. The tri-layer lithography structure 201 includes a first layer 211 formed on an upper surface of the substrate recognition layer 123, and a second layer 212 formed on an upper surface of the first layer 211. The first layer 211 includes an organic planarization layer and the second layer 212 includes an anti-refraction coating. The anti-refraction coating includes silicon. The first layer 211 includes a thickness T5 within a range of 60 nm to 1 micron. The second layer 212 includes a thickness T6 within a range of 15 nm to 100 nm.

The tri-layer lithography structure 201 includes a plurality of photoresist structures 217 patterned and formed on an upper surface of the second layer 212. The photoresist structures include a thickness T7 within a range of 10 nm to 3 microns.

According to the method 200, a first etching operation is conducted to etch the tri-layer lithography structure 201 and the substrate recognition layer 123. The tri-layer lithography structure 201 is etched to remove the plurality of photoresist structures 217, the second layer 212, and the first layer 211. The substrate recognition layer 123 is etched to open portions 223A of the substrate recognition layer 123 that are aligned vertically between or aligned vertically outside of the photoresist structures 217.

During the first etching operation the photoresist structures 217, portions of the first layer 211 aligned vertically with the photoresist structures 217, portions of the second layer 212 aligned vertically with the photoresist structures 217, and portions 223B of the substrate recognition layer 123 aligned vertically with the photoresist structures 217 are etched at a first etch rate. Also during the first etching operation, portions of the first layer 211 aligned vertically between and vertically outside of the photoresist structures 217, portions of the second layer 212 aligned vertically between vertically outside of the photoresist structures 217, and portions 223A of the substrate recognition layer 123 aligned vertically between and vertically outside of the photoresist structures 217 are etched at a second etch rate that is different than the first etch rate. In one embodiment, which can be combined with other embodiments, the second etch rate is a ratio of 2:1 relative to the first etch rate.

During the first etching operation, the second layer 212 is etched using a composition that includes fluorine. In one example, the composition used to etch the second layer 212 includes one or more of carbon tetrafluoride ($CF_4$), fluoroform ($CHF_3$), difluoromethane ($CH_2F_2$), fluoromethane ($CH_3F$), sulfur hexafluoride ($SF_6$), and/or nitrogen trifluoride ($NF_3$). During the first etching operation, the first layer 211 is etched using a composition that includes one or more of oxygen and/or hydrogen. In one example, the composition used to etch the first layer 211 includes one or more of oxygen ($O_2$), dihydrogen ($H_2$), carbon monoxide (CO), and/or carbon dioxide ($CO_2$). In one embodiment, which can be combined with other embodiments, the composition used to etch the first layer 211 includes a passivation composition. In one example, the passivation composition includes one or more of methane ($CH_4$), ethylene ($C_2H_4$), nitrogen ($N_2$), dichlorine ($Cl_2$), and/or hydrogen bromide (HBr). The passivation composition facilitates maintaining critical dimension and profile of the film stack 120. In one example, residual portions of the photoresist structures 217 left on the second layer 212 are removed during the etching of the first layer 211.

Figure 2B:
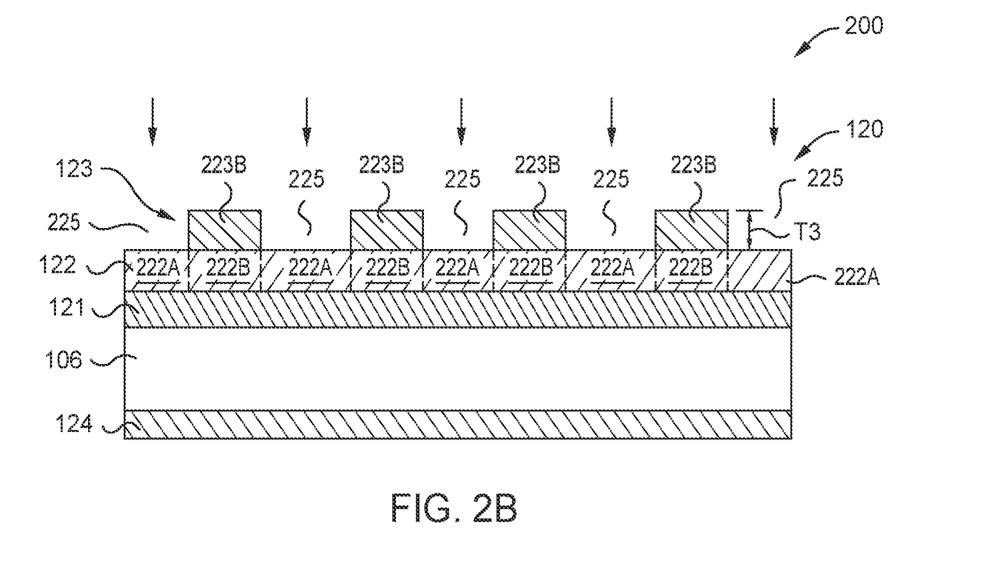
FIG. 2B illustrates the film stack illustrated in FIG. 2A after the tri-layer lithography structure and the substrate recognition layer are etched using a first etching operation, according to one implementation.

During the first etching operation, the portions 223A of the substrate recognition layer 123 are etched using a composition that includes fluorine. In one example, the composition used to etch the portions 223A of the substrate recognition layer 123 includes one or more of carbon tetrafluoride ($CF_4$), fluoroform ($CHF_3$), sulfur hexafluoride ($SF_6$), and/or nitrogen trifluoride ($NF_3$). In one example, residual portions of the second layer 212 left on the first layer 211 are removed during the etching of the portions 223A of the substrate recognition layer 123. FIG. 2B illustrates the film stack 120 illustrated in FIG. 2A after the tri-layer lithography structure 201 and the substrate recognition layer 123 are etched using the first etching operation, according to one implementation. The portions 223A of the substrate recognition layer 123 are opened to form openings 225 between and outside of the portions 223B. The portions 223B form a third plurality of structures between the openings 225 and on the upper surface of the hard mask layer 122. The portions 223B being vertically aligned with the photoresist structures 217 prior to the first etching operation (as illustrated in FIG. 2A) facilitates forming the third plurality of structures 223B, as illustrated in FIG. 2B. A first plurality of structures of the device function layer 121 and a second plurality of structures of the hard mask layer 122 are described below.

According to the method 200, a second etching operation is conducted on the film stack 120. During the second etching operation, the hard mask layer 122 is selectively etched relative to the third plurality of structures 223B of the substrate recognition layer 123 to open portions 222A of the hard mask layer 122. During the second etching operation, the portions 222A of the hard mask layer 122 are etched using a composition that includes one or more of chlorine and/or oxygen. In one example, the composition used to etch the portions 222A includes one or more of dichlorine ($Cl_2$), boron trichloride ($BCl_3$), and/or silicon tetrachloride ($SiCl_4$), and/or one or more of oxygen ($O_2$), carbon monoxide (CO), carbon dioxide ($CO_2$), and/or ozone ($O_3$). In one example, residual portions of the first layer 211 left on the third plurality of structures 223B are removed during the etching of the portions 222A of the hard mask layer 122.

Figure 2C:
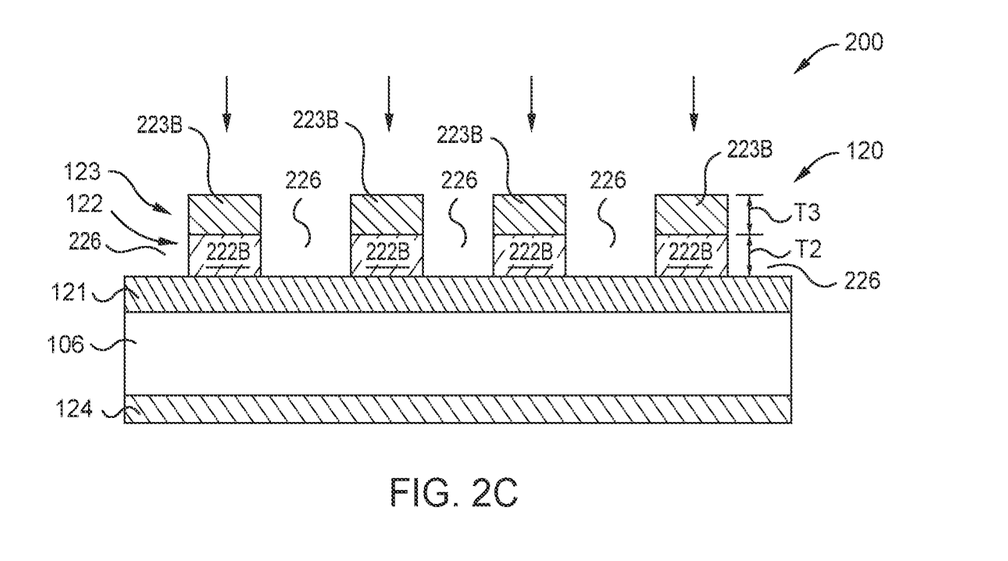
FIG. 2C illustrates the film stack illustrated in FIG. 2B after the hard mask layer is selectively etched using a second etching operation, according to one implementation.

FIG. 2C illustrates the film stack 120 illustrated in FIG. 2B after the hard mask layer 122 is selectively etched using the second etching operation, according to one implementation. The portions 222A of the hard mask layer 122 are etched to form a second plurality of structures 222B on the upper surface of the device function layer 121. The second plurality of structures 222B are hard mask structures. The portions 222B of the hard mask layer 122 being vertically aligned with the third plurality of structures 223B facilitates patterning and forming the second plurality of structures 222B. Openings 226 are also formed between the second plurality of structures 222B. Each hard mask structure 222B of the second plurality of structures 222B is disposed under a hard mask structure 223B of the third plurality of structures 223B. The third plurality of structures 223B are supported on the second plurality of structures 222B.

According to the method 200, a third etching operation is conducted on the film stack 120. The third etching operation may include dry etching or wet etching. The third plurality of structures 223B of the substrate recognition layer 123 are selectively etched relative to the device function layer 121 to remove the third plurality of structures 223B.

During the third etching operation, the third plurality of structures 223B of the substrate recognition layer 123 are etched using a composition that includes one or more of chlorine or fluorine. In one example, the composition used to etch the third plurality of structures 223B includes one or more of dichlorine ($Cl_2$), boron trichloride ($BCl_3$), and/or silicon tetrachloride ($SiCl_4$), one or more of carbon tetrafluoride ($CF_4$), fluoroform ($CHF_3$), difluoromethane ($CH_2F_2$), fluoromethane ($CH_3F$), sulfur hexafluoride ($SF_6$), and/or nitrogen trifluoride ($NF_3$). In one example, the composition used to etch the third plurality of structures 223B also includes a dilute composition that includes one or more of argon (Ar), helium (He), and/or krypton (Kr). In one example, the composition used to etch the third plurality of structures 223B also includes a passivation composition that includes one or more of methane ($CH_4$), ethylene ($C_2H_4$), nitrogen ($N_2$), dichlorine ($Cl_2$), and/or hydrogen bromide (HBr). The passivation composition facilitates maintaining critical dimension and profile of the film stack 120.

Figure 2D:
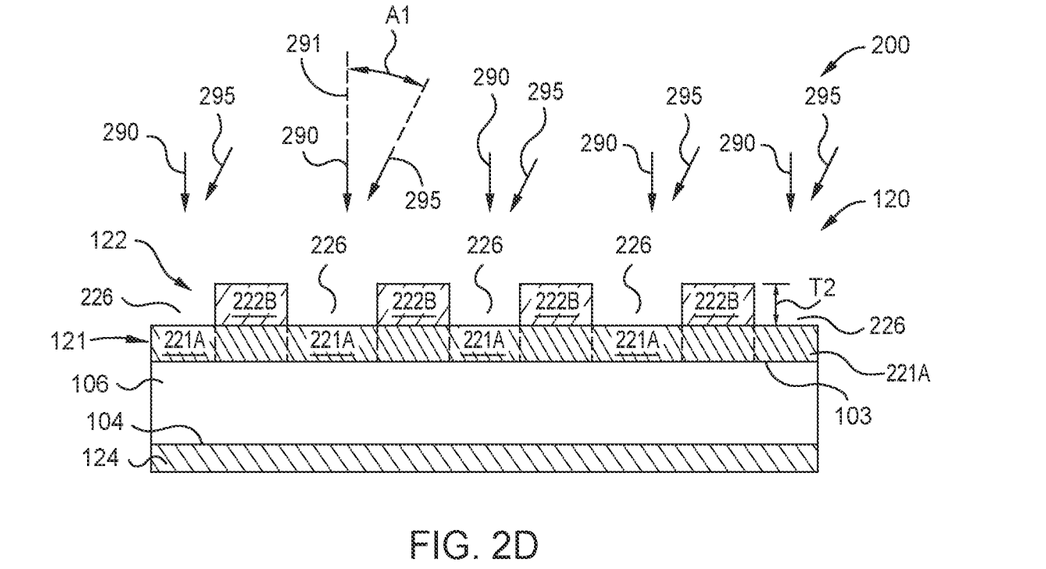
FIG. 2D illustrates the film stack illustrated in FIG. 2C after the substrate recognition layer is selectively etched using a third etching operation, according to one implementation.

FIG. 2D illustrates the film stack 120 illustrated in FIG. 2C after the substrate recognition layer 123 is selectively etched using the third etching operation, according to one implementation. The third plurality of structures 223B of the substrate recognition layer 123 have been removed.

According to the method 200, a fourth etching operation is conducted on the film stack 120. The fourth etching operation includes a binary etching operation or an angled etching operation. The fourth etching operation includes dry etching or wet etching. During the fourth etching operation, portions 221A of the device function layer 121 between and outside of the second plurality of structures 222B are selectively etched relative to the second plurality of structures 222B to open the portions 221A of the device function layer 121. During the fourth etching operation, the portions 221A of the device function layer 121 are etched using a composition that includes one or more of chlorine or fluorine. In one example, the composition used to etch the portions 221A includes one or more of dichlorine ($Cl_2$), boron trichloride ($BCl_3$), and/or silicon tetrachloride ($SiCl_4$), one or more of carbon tetrafluoride ($CF_4$), fluoroform ($CHF_3$), difluoromethane ($CH_2F_2$), fluoromethane ($CH_3F$), sulfur hexafluoride ($SF_6$), and/or nitrogen trifluoride ($NF_3$). In one example, the composition used to etch the portions 221A also includes a dilute composition that includes one or more of argon (Ar), helium (He), and/or krypton (Kr). In one example, the composition used to etch the portions 221A also includes a passivation composition that includes one or more of methane ($CH_4$), ethylene ($C_2H_4$), nitrogen ($N_2$), dichlorine ($Cl_2$), and/or hydrogen bromide (HBr). The passivation composition facilitates maintaining critical dimension and profile of the film stack 120. In one example, residual portions of the substrate recognition layer 123 (e.g., the third plurality of structures 223B) left on the second plurality of structures 222B are removed during the etching of the portions 221A.

Figure 2E:
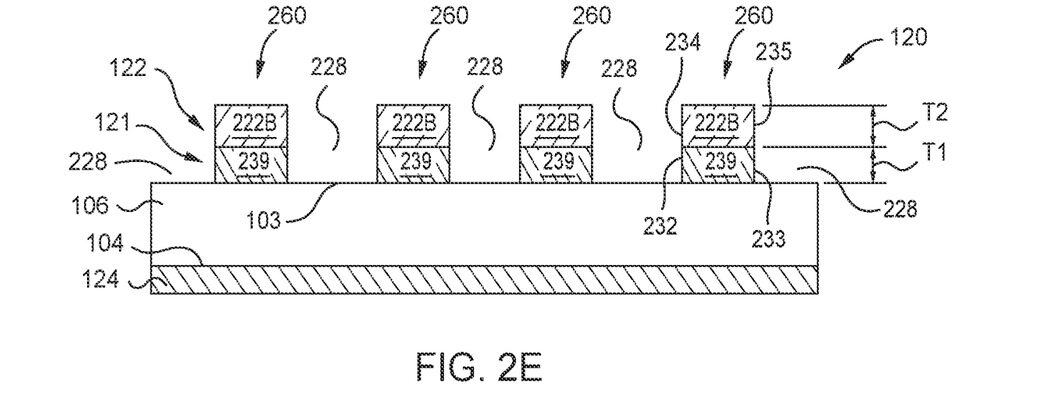
FIG. 2E illustrates the film stack illustrated in FIG. 2D after the device function layer is selectively etched using a fourth etching operation having a binary etching operation, according to one implementation.

FIG. 2E illustrates the film stack 120 illustrated in FIG. 2D after the device function layer 121 is selectively etched using the fourth etching operation having the binary etching operation, according to one implementation. The binary etching operation includes reactive ion etching. In the reactive ion etching, ions 290 (shown in FIG. 2D) are directed toward the device function layer 121 and parallel to an axis 291 extending perpendicular to the first surface 103 of the substrate 106. The binary etching operation opens the portions 221A of the device function layer 121 to form openings 228 and a first plurality of structures 239 between the openings 228. The first plurality of structures 239 are formed on the first surface 103 of the substrate 106 and between the first surface 103 and the second plurality of structures 222B. The first plurality of structures 239 of the device function layer 121 being vertically aligned with the second plurality of structures 222B facilitates patterning and forming the first plurality of structures 239. Each hard mask structure 239 of the first plurality of structures 239 includes a first side surface 232 and a second side surface 233 that both extend perpendicular to the first surface 103 of the substrate 106. The first side surface 232 is aligned with a first side surface 234 of an adjacent one of the second plurality of structures 222B, and the second side surface 233 is aligned with a second side surface 235 of an adjacent one of the second plurality of structures 222B. In one embodiment, which can be combined with other embodiments, the first side surface 232 and the second side surface 233 are parallel to the axis 291. The second plurality of structures 222B are supported on the first plurality of structures 239 to form a plurality of stacks 260 on the first surface 103.

Figure 2F:
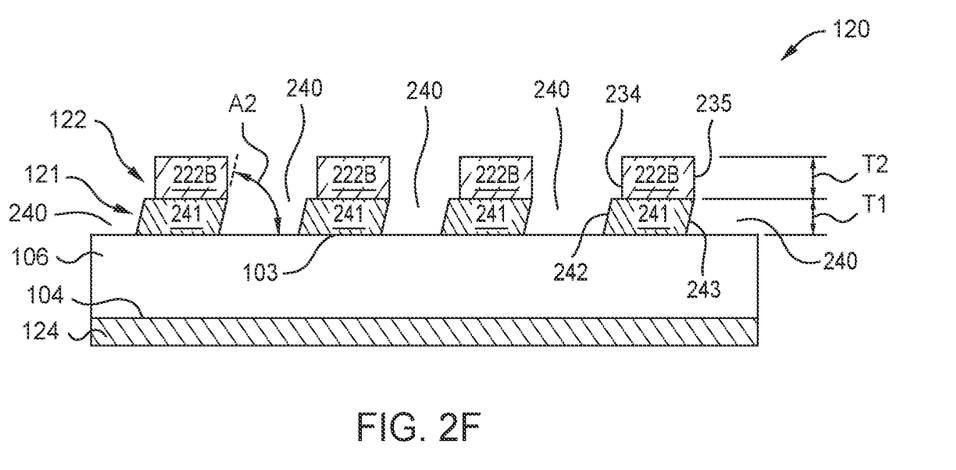
FIG. 2F illustrates the film stack illustrated in FIG. 2D after the device function layer is selectively etched using a fourth etching operation having an angled etching operation, according to one implementation.

FIG. 2F illustrates the film stack 120 illustrated in FIG. 2D after the device function layer 121 is selectively etched using the fourth etching operation having the angled etching operation, according to one implementation. The angled etching operation includes physical ion bombardment. Ions 295 (illustrated in FIG. 2D are directed toward the device function layer 121 at a first angle A1 relative to the first surface 103 of the substrate 106. The first angle A1 is measured relative to the axis 291. The first angle A1 is between 0 degrees and 90 degrees. In one embodiment, which can be combined with other embodiments, the first angle A1 is within a range of 0 degrees to 60 degrees. The angled etching operation opens the portions 221A of the device function layer 121 to form openings 240 at an angle and a plurality of angled hard mask structures 241. The plurality of angled hard mask structures 241 of the device function layer 121 being vertically aligned with the second plurality of structures 222B facilitates patterning and forming the plurality of angled hard mask structures 241.

Each angled hard mask structure 241 of the plurality of angled hard mask structures 241 includes a first angled side surface 242 and a second angled side surface 243 that extend from the first surface 103 at a second angle A2. The second angle A2 is between 0 degrees and 90 degrees. In one embodiment, which can be combined with other embodiments, the second angle A2 is within a range of 30 degrees to 70 degrees. The second angle A2 is larger than the first angle A1. The first angle A1 and the second angle A2 add up to be approximately 90 degrees. The first angled side surface 242 is disposed at an angle relative to the first side surface 234 of the adjacent hard mask structure 222B of the second plurality of structures 222B. The second angled side surface 243 is disposed at an angle relative to the second side surface 235 of the adjacent hard mask structure 222B of the second plurality of structures 222B.

In one embodiment, which can be combined with other embodiments, a fifth etching operation is conducted after the fourth etching operation to remove the second plurality of structures 222B of the hard mask layer 122. In one example, second plurality of structures 222B are selectively etched relative to the substrate 106. The fifth etching operation includes wet etching or dry etching. In one example, the wet etching uses a composition that includes ceric ammonium nitrate (CAN). In one example, the dry etching includes one or more of dichlorine ($Cl_2$) and/or oxygen ($O_2$).

In an example where the binary etching is used in the fourth etching operation, the second plurality of structures 222B are removed from the first plurality of structures 239

(as illustrated in FIG. 2E) after the fifth etching operation. The first plurality of structures 239 (as illustrated in FIG. 2E) remain on the first surface 103 of the substrate 106 after the fifth etching operation. In an example where the angled etching is used in the fourth etching operation, the second plurality of structures 222B are removed from the plurality of angled hard mask structures 241 (as illustrated in FIG. 2F) after the fifth etching operation. The plurality of angled hard mask structures 241 (as illustrated in FIG. 2F) remain on the first surface 103 of the substrate 106 after the fifth etching operation. In one embodiment, which can be combined with other embodiments, one or more of the first etching operation, the second etching operation, the third etching operation, the fourth etching operation, and/or the fifth etching operation are combined and/or conducted simultaneously. In one example, the third etching operation and the fourth etching operation are combined into a single etching operation to simultaneously remove the third plurality of structures 223B and the portions 221A of the device function layer 121 using the same composition for etching.

In one embodiment, which can be combined with other embodiments, the device function layer 121 is omitted from the film stack 120 such that the second plurality of structures 222B are formed on the first surface 103 of the substrate 106 after the third etching operation is conducted. In one example, the fourth etching operation is omitted, and the fifth etching operation etches the hard mask layer 122 and the substrate 106. In such an example, the fifth etching operation removes the second plurality of structures 222B and portions of the substrate 106 aligned vertically between the second plurality of structures 222B to form recesses in the substrate 106.

Aspects of the second plurality of structures 222B, such as the chromium the ruthenium, and/or the titanium nitride facilitate selectively etching the device function layer 121 relative to the second plurality of structures 222B. As an example, the chromium, titanium nitride, and/or the ruthenium of the second plurality of structures 222B facilitate selectively etching the device function layer 121 at an angle to form the first and second angled side surfaces 242, 243 when the angled etching operation is used. For example, the chromium, the titanium nitride, and/or the ruthenium facilitate using a thinner hard mask layer 122 to facilitate reduced or eliminated 3-D shadow effects on critical dimension size of the film stack 120 during angled etching. As an example, the chromium, the titanium nitride, and/or the ruthenium also facilitate selective etching and beneficial etch rates, for example, during the etching of the portions 221A, to facilitate accurate control of critical dimension size of the film stack 120. The angled etching operation also facilitates a beneficial light vector for the film stack 120.

Figure 3:
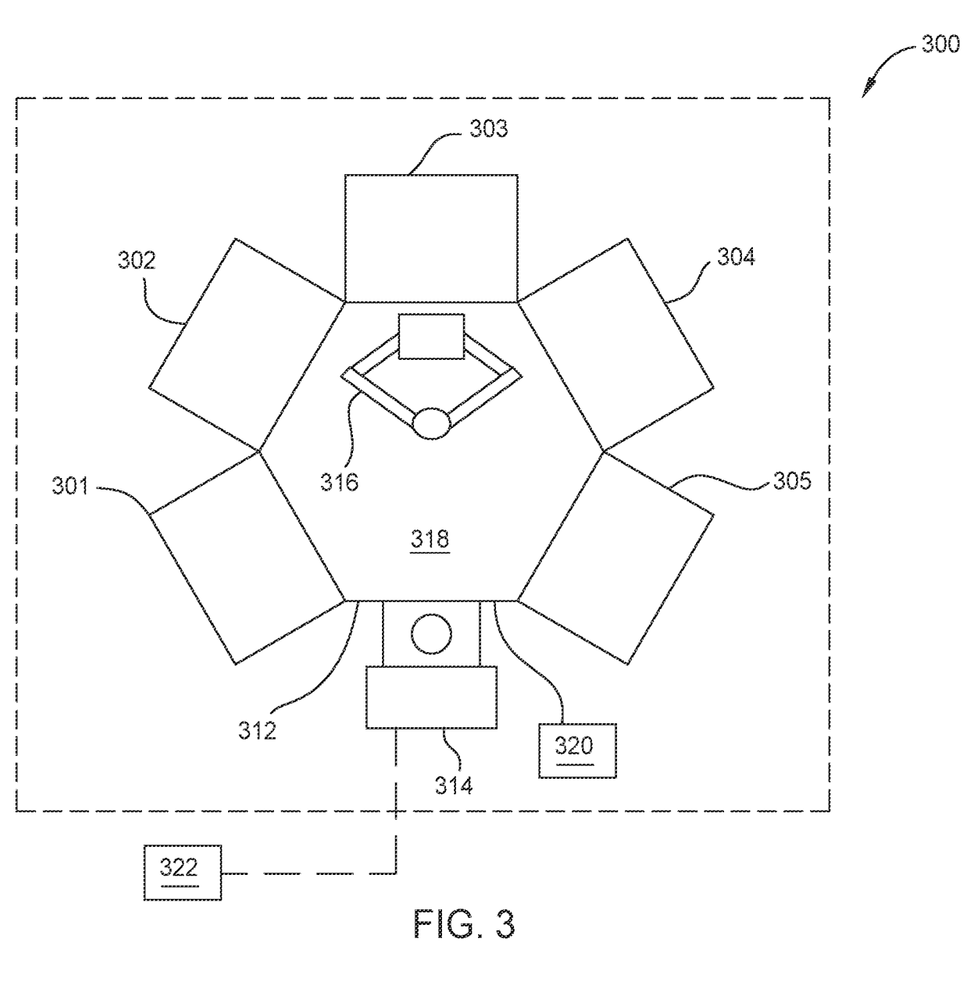
FIG. 3 is a schematic partial view of a processing system, according to one implementation.

FIG. 3 is a schematic partial view of a processing system 300, according to one implementation. The processing system 300 includes a plurality of process chambers 301-305 and a transfer chamber 312. The transfer chamber 312 includes a transfer robot 316 disposed in a transfer volume 318 of the transfer chamber 312. The processing system 300 also includes a factory interface 314. The film stack 120 including the substrate 106 discussed above may be provided to the processing system 300 using the factory interface 314. The processing system 300 receives the film stack 120, and the transfer robot 316 facilitates transferring the film stack 120 into, out of, and between the plurality of process chambers 301-305. In one example, the processing system 300 receives the film stack 120 from a second system 322 that formed the layers 121-123 on the first surface 103 of the substrate 106 and the one or more backside layers 124 on the second surface 104 of the substrate 106.

A lithography chamber 301 includes a lithography system, such as the lithography system 100 discussed above, that patterns and forms the tri-layer lithography structure 201 on the film stack 120. The present disclosure contemplates that a different system, such as a third system, may pattern the tri-layer lithography structure 201 on the film stack 120 prior to the film stack being received by the processing system 300. A first etch chamber 302 conducts the first etching operation discussed in relation to FIGS. 2A and 2B. A first etch chamber 302 conducts the first etching operation discussed in relation to FIGS. 2A and 2B. A second etch chamber 303 conducts the second etching operation discussed in relation to FIGS. 2B and 2C. A third etch chamber 304 conducts the third etching operation discussed in relation to FIGS. 2C and 2D. A fourth etch chamber 305 conducts the fourth etching operation discussed in relation to FIGS. 2D, 2E, and 2F. The present disclosure contemplates that a single etch chamber may conduct one or more of the first through fourth etching operations.

The processing system 300 includes a controller 320 that is in communication with one or more of the processing system 300, the second processing system 322, and/or the third processing system. The controller 320 includes a non-transitory computer readable medium storing instructions that, when executed by a processor of the controller 320, cause one or more of the operations described herein. In one embodiment, which can be combined with other embodiments, the instructions when executed by the processor cause the plurality of layers 121-123 to be formed on the first surface 103 of the substrate 106 and cause the backside layer 124 to be formed on the second surface 104. In one embodiment, which can be combined with other embodiments, the instructions when executed by the processor cause the tri-layer lithography structure 201 to be patterned and formed on the film stack 120 having the substrate 106. In one embodiment, which can be combined with other embodiments, the instructions when executed by the processor cause one or more of the first etching operation, the second etching operation, the third etching operation, the fourth etching operation, and/or the fifth etching operation to be conducted. In one embodiment, which can be combined with other embodiments, the instructions when executed by the processor cause one or more of the operations of the method 200 to be conducted.

Benefits of the present disclosure include using transparent glass substrates with lithography systems to pattern the glass substrates; facilitating lithography machine recognition of glass substrates; contrast of at least one hard mask layer relative to other hard mask layers and/or the glass substrate; facilitating alignment of glass substrates relative to lithography machines; facilitating angled etching operations; increased efficiency, increased die-per-substrate, reduced substrate defects, increased machine throughput, reduced machine downtime, and reduced operational costs.

Aspects of the present disclosure include a glass substrate; one or more layers formed on a first surface of the glass substrate; one or more backside layers formed on a second surface of the glass substrate; at least one hard mask layer including chromium, ruthenium, and/or titanium nitride; a hard mask layer between a device function layer and a substrate recognition layer including chromium, ruthenium, and/or titanium nitride; and an angled etching operation. It is contemplated that one or more aspects disclosed herein may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof. The present disclosure also contemplates that one or more aspects of the embodiments described herein may be substituted in for one or more of the other aspects described. The scope of the disclosure is determined by the claims that follow.

What is claimed is:

1. A film stack for optical devices, comprising:
a transparent substrate comprising a first surface and a second surface, the second surface opposing the first surface and the first surface being disposed above the second surface;
a device function layer formed on the first surface, wherein the device function layer comprises one or more of titanium dioxide or niobium monoxide;
a hard mask layer formed on the device function layer, the hard mask layer comprising one or more of chromium, ruthenium, or titanium nitride;
a substrate recognition layer formed on the hard mask layer; and
a backside layer formed on the second surface, the backside layer comprising one or more of a conductive layer or an oxide layer.

2. The film stack of claim 1, wherein the substrate recognition layer comprises silicon.

3. The film stack of claim 1, wherein the hard mask layer comprises a thickness within a range of 10 nm to 400 nm.

4. The film stack of claim 3, wherein:
the device function layer comprises a thickness within a range of 20 nm to 500 nm; and
the substrate recognition layer comprises a thickness within a range of 10 nm to 200 nm.

5. The film stack of claim 1, wherein the backside layer formed on the second surface comprises one or more of silicon or silicon oxide.

6. The film stack of claim 5, wherein the backside layer comprises a thickness within a range of 10 nm to 600 nm.

7. A method of processing a film stack for optical devices, comprising:
positioning the film stack, the film stack comprising:
a transparent substrate comprising a first surface and a second surface, the second surface opposing the first surface and the first surface being disposed above the second surface;
a plurality of layers comprising:
a device function layer formed on the first surface, wherein the device function layer comprises one or more of titanium dioxide or niobium monoxide;
a hard mask layer formed on the device function layer, the hard mask layer comprising one or more of chromium, ruthenium, or titanium nitride; and
a substrate recognition layer formed on the hard mask layer; and
a backside layer formed on the second surface, the backside layer comprising one or more of a conductive layer or an oxide layer;
recognizing the substrate recognition layer of the plurality of layers;
patterning the film stack to form a tri-layer lithography structure on the plurality of layers; and
etching the tri-layer lithography structure and the plurality of layers to form a first plurality of structures on the first surface of the transparent substrate and a second plurality of structures stacked on the first plurality of structures.

8. The method of claim 7, wherein the etching the plurality of layers comprises selectively etching the device function layer formed on the first surface of the transparent substrate relative to the second plurality of structures, the etching comprises binary etching, and the binary etching comprises reactive ion etching.

9. The method of claim 7, further comprising, prior to the patterning, aligning the film stack relative to a lithography system using one or more alignment marks formed on the hard mask layer.

10. The method of claim 7, wherein the etching the plurality of layers comprises selectively etching the device function layer formed on the first surface of the transparent substrate relative to the second plurality of structures, and the etching comprises angled etching.

11. The method of claim 10, wherein the angled etching comprises physical ion bombardment.

12. The method of claim 7, wherein the first plurality of structures comprises one or more of titanium dioxide or niobium monoxide.

13. The method of claim 12, wherein the backside layer formed on the second surface comprises one or more of silicon or silicon oxide.

14. The method of claim 13, wherein the second plurality of structures comprises a thickness within a range of 10 nm to 400 nm.

15. The method of claim 7, wherein:
the tri-layer lithography structure comprises:
a first layer formed on the substrate recognition layer,
a second layer formed on the first layer, and
a plurality of photoresist structures formed on the second layer.

16. The method of claim 15, wherein the etching the tri-layer lithography structure and the plurality of layers comprises:
etching the plurality of photoresist structures, portions of the first layer aligned vertically with the photoresist structures, portions of the second layer aligned vertically with the photoresist structures, and portions of the substrate recognition layer aligned vertically with the photoresist structures at a first etch rate; and
etching portions of the first layer aligned vertically between the photoresist structures, portions of the second layer aligned vertically between the photoresist structures, and portions of the substrate recognition layer aligned vertically between the photoresist structures at a second etch rate that is different than the first etch rate.

17. The method of claim 16, wherein the second etch rate is a ratio of 2:1 relative to the first etch rate.

18. A film stack for optical devices, comprising:
a transparent substrate comprising a first surface and a second surface, the second surface opposing the first surface and the first surface being disposed above the second surface;
a plurality of stacks formed on the first surface, each stack of the plurality of stacks comprising:
a first plurality of structures formed on the first surface of the transparent substrate, and
a second plurality of structures stacked on the first plurality of structures, wherein one or more of the first plurality of structures or the second plurality of structures comprises:

a device function layer, wherein the device function layer comprises one or more of titanium dioxide or niobium monoxide;

a hard mask layer formed on the device function layer, the hard mask layer comprising one or more of chromium, ruthenium, or titanium nitride; and a substrate recognition layer formed on the hard mask layer; and a backside layer formed on the second surface of the transparent substrate, the backside layer comprising one or more of a conductive layer or an oxide layer.

19. The film stack of claim 18, wherein each structure of the second plurality of structures comprises a first angled side surface and a second angled side surface.

* * * * *